(12) United States Patent
Liu et al.

(10) Patent No.: US 9,667,345 B2
(45) Date of Patent: May 30, 2017

(54) METHOD, APPARATUS, AND SYSTEM FOR ENCODING AND DECODING VISIBLE LIGHT SIGNAL

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/011,567

(22) Filed: Jan. 31, 2016

(65) Prior Publication Data

US 2016/0164605 A1    Jun. 9, 2016

Related U.S. Application Data

(63) Continuation of application No. PCT/CN2014/082955, filed on Jul. 24, 2014.

(30) Foreign Application Priority Data

Jul. 31, 2013    (CN) .......................... 2013 1 0328832

(51) Int. Cl.
 *H04B 10/116*    (2013.01)
(52) U.S. Cl.
 CPC ................... *H04B 10/116* (2013.01)
(58) Field of Classification Search
 CPC ................................................. H04B 10/116

(Continued)

(56) References Cited

U.S. PATENT DOCUMENTS

| | | | |
|---|---|---|---|
| 2006/0239689 A1* | 10/2006 | Ashdown | H04B 10/1141 398/130 |
| 2009/0208221 A1* | 8/2009 | Sasai | H04B 1/707 398/130 |

(Continued)

FOREIGN PATENT DOCUMENTS

| | | |
|---|---|---|
| CN | 101404559 A | 4/2009 |
| CN | 102694597 A | 9/2012 |

(Continued)

OTHER PUBLICATIONS

Kwonhyung Lee et al: "Modulations for Visible Light Communications With Dimming Control", IEEE Photonics Technology Letters, IEEE Service Center, Piscataway, NJ, US, vol. 23, No. 16, Aug. 1, 2011 (Aug. 1, 2011), pp. 1136-1138, XP011336157, ISSN: 1041-1135, DOI:10.1109/LPT.2011.2157676.

*Primary Examiner* — Dalzid Singh
(74) *Attorney, Agent, or Firm* — Perkins Coie LLP

(57) ABSTRACT

The present disclosure provides a method, an apparatus, and a system for encoding and decoding a visible light signal. The encoding method includes the following steps: dividing to-be-transmitted data into a plurality of data units, where each data unit includes one or more bits; converting the data units into a plurality of electrical signal units, where for each electrical signal unit, the number of level transitions is used to represent the one or more bits of a corresponding data unit, and an interval indicated by a predetermined level exists between adjacent electrical signal units, where a level in each electrical signal unit has a first level duration, and the predetermined level between adjacent electrical signal units has a second level duration; combining the electrical signal units to obtain an encoded electrical signal; and transmitting the encoded electrical signal in a visible light signal form.

20 Claims, 7 Drawing Sheets

(58) Field of Classification Search
USPC .......................................................... 398/118
See application file for complete search history.

(56) References Cited

U.S. PATENT DOCUMENTS

| | | |
|---|---|---|
| 2011/0069965 A1 | 3/2011 | Kim et al. |
| 2011/0164884 A1* | 7/2011 | Yamada ............... H04B 10/116 398/172 |
| 2011/0305457 A1* | 12/2011 | Kikuchi ............. H04B 10/5055 398/65 |
| 2012/0257898 A1* | 10/2012 | Yokoi ................. H04L 27/2697 398/76 |
| 2015/0305122 A1* | 10/2015 | Saes ................... H05B 33/0842 315/129 |

FOREIGN PATENT DOCUMENTS

| | | |
|---|---|---|
| CN | 102694598 A | 9/2012 |
| CN | 103812557 A | 5/2014 |
| EP | 0599522 A1 | 6/1994 |

* cited by examiner ived on a basis of an LED technology. A basic principle of visible light communication is that communication is performed by flashing an LED light source at a high frequency based on a characteristic that a switching speed of a light emitting diode (LED) is higher than that of a fluorescent lamp and an incandescent lamp. Presence of light represents binary 1, and absence of light represents binary 0. Information may be obtained after a high-speed light signal including digital information undergoes photoelectric conversion. In the wireless light communications technology, data is unlikely to be interfered with or captured, and an optical communication device can be easily made and is unlikely to be damaged or degaussed. Therefore, a wireless optical encryption key can be made according to the wireless light communication technology. Compared with microwave technologies, abundant spectrum resources can be used in the wireless light communication, which is incomparable with general microwave communication and wireless communication. In addition, the visible light communication is applicable to any communications protocol, and applicable to any environment. In terms of security, in contrast to conventional magnetic materials, there is no need to worry about a problem of degaussing, or even to worry about unlawful interception of communication content. A wireless optical communication device features flexible and convenient installation and layout, and a low cost, and is applicable to large-scale popularity and application.

METHOD, APPARATUS, AND SYSTEM FOR ENCODING AND DECODING VISIBLE LIGHT SIGNAL

CROSS REFERENCE TO RELATED APPLICATIONS

This application is a continuation of PCT/CN2014/082955 filed on Jul. 24, 2014, which claims priority to Chinese patent application No. 201310328832.1 of Jul. 31, 2013, both of which are incorporated herein by reference.

TECHNICAL FIELD OF THE INVENTION

The disclosure relates to visible light communication, and in particular, to a method, an apparatus, and a system for encoding and decoding a visible light signal.

BACKGROUND OF THE INVENTION

Visible light communication is an emerging short-range high-speed wireless light communications technology that is developed on a basis of an LED technology. A basic principle of visible light communication is that communication is performed by flashing an LED light source at a high frequency based on a characteristic that a switching speed of a light emitting diode (LED) is higher than that of a fluorescent lamp and an incandescent lamp. Presence of light represents binary 1, and absence of light represents binary 0. Information may be obtained after a high-speed light signal including digital information undergoes photoelectric conversion. In the wireless light communications technology, data is unlikely to be interfered with or captured, and an optical communication device can be easily made and is unlikely to be damaged or degaussed. Therefore, a wireless optical encryption key can be made according to the wireless light communication technology. Compared with microwave technologies, abundant spectrum resources can be used in the wireless light communication, which is incomparable with general microwave communication and wireless communication. In addition, the visible light communication is applicable to any communications protocol, and applicable to any environment. In terms of security, in contrast to conventional magnetic materials, there is no need to worry about a problem of degaussing, or even to worry about unlawful interception of communication content. A wireless optical communication device features flexible and convenient installation and layout, and a low cost, and is applicable to large-scale popularity and application.

With fast promotion of visible light communication, a technology by using an LED (light emitting diode) of an electronic device to transmit a visible light signal is proposed. In the electronic device, a signal duty cycle in turn-on or turn-off of the LED is uncertain, but a duration in which the LED is on and a duration in which the LED is off may be controlled, where on and off may respectively indicate a high level and a low level. Therefore, LED transmits a visible light signal that represents data information according to a special encoding mode. However, during practice, the inventors of the present application found that a transmission rate (namely, an amount of information transmitted within a unit time) in a conventional method is still low. There is still room for improvement.

SUMMARY OF THE INVENTION

A technical problem to be solved by the present disclosure is to provide a method, an apparatus, and a system for encoding and decoding a visible light signal to improve an information transmission rate of visible light communication based on an LED.

A technical solution used by the present disclosure to solve the foregoing technical problem is to provide a method for encoding a visible light signal. The method includes the following steps: dividing to-be-transmitted data into a plurality of data units, where each data unit includes one or more bits; converting the data units into a plurality of electrical signal units, where for each electrical signal unit, the number of level transitions is used to represent the one or more bits of a corresponding data unit, and an interval indicated by a predetermined level exists between adjacent electrical signal units, where the level transitions are low-level to high-level transitions and high-level to low-level transitions, a level in each electrical signal unit has a first level duration, and the predetermined level between adjacent electrical signal units has a second level duration; combining the electrical signal units to obtain an encoded electrical signal; and transmitting the encoded electrical signal in a visible light signal form.

In an embodiment of the present disclosure, the first level duration is adjusted according to a pre-obtained flashing delay of a light emitting diode used as an emitter.

In an embodiment of the present disclosure, the second level duration is significantly greater than the first level duration.

In an embodiment of the present disclosure, the second level duration is adjusted according to a pre-obtained flashing delay of a light emitting diode used as an emitter.

In an embodiment of the present disclosure, each data unit includes N bits, and N is a natural number.

The present disclosure further provides a method for decoding a visible light signal. The method includes the following steps: receiving a visible light signal and converting it into an electrical signal; when detecting a level transition, determining that an electrical signal unit begins, and starting timing; when a detected level duration is greater than a first threshold but less than or equal to a second threshold, recording the number of level transitions, where the level transitions are low-level to high-level transitions and high-level to low-level transitions; when a detected level duration is greater than the second threshold but less than or equal to a third threshold, determining that the electrical signal unit ends; when a detected level duration is greater than the third threshold, determining that the signal is received completely; converting each received electrical signal unit into a data unit; and combining a plurality of data units into data; where the third threshold is greater than the second threshold, the second threshold is greater than the first threshold.

In an embodiment of the present disclosure, the first threshold is adjusted according to a pre-obtained flashing delay of a light emitting diode used as an emitter.

In an embodiment of the present disclosure, the second threshold and/or the third threshold is adjusted according to a pre-obtained flashing delay of a light emitting diode used as an emitter.

In an embodiment of the present disclosure, the method further includes: comparing the data with a preset condition, and if the data matches the preset condition, using the data to control a controlled device.

In an embodiment of the present disclosure, that the data matches the preset condition includes that the data is the same as or corresponds to the preset condition.

The present disclosure further provides an apparatus for encoding a visible light signal, where the apparatus includes:

a module configured to divide to-be-transmitted data into a plurality of data units, where each data unit includes one or more bits; a module configured to convert the data units into a plurality of electrical signal units, where for each electrical signal unit, the number of level transitions is used to represent the one or more bits of a corresponding data unit, and an interval indicated by a predetermined level exists between adjacent electrical signal units, where the level transitions are low-level to high-level transitions and high-level to low-level transitions, a level in each electrical signal unit has a first level duration, and the predetermined level between adjacent electrical signal units has a second level duration; a module configured to combine the electrical signal units to obtain an encoded electrical signal; and a module configured to transmit the encoded electrical signal in a visible light signal form.

In an embodiment of the present disclosure, the module configured to convert the data units into a plurality of electrical signal units determines, according to a preset correspondence table, the number of level transitions in an electrical signal unit corresponding to the to-be-transmitted data unit.

In an embodiment of the present disclosure, the first level duration is adjusted according to a pre-obtained flashing delay of a light emitting diode used as an emitter.

In an embodiment of the present disclosure, the second level duration is significantly greater than the first level duration.

In an embodiment of the present disclosure, the second level duration is adjusted according to a pre-obtained flashing delay of a light emitting diode used as an emitter.

In an embodiment of the present disclosure, each data unit includes N bits, and N is a natural number.

The present disclosure further provides an apparatus for decoding a visible light signal, where the apparatus includes: a module configured to receive a visible light signal and convert it into an electrical signal; a module configured to determine, when a level transition is detected, that an electrical signal unit begins, and start timing; a module configured to record the number of level transitions when a detected level duration is greater than a first threshold but less than or equal to a second threshold, where the level transitions are low-level to high-level transitions and high-level to low-level transitions; a module configured to determine, when a detected level duration is greater than the second threshold but less than or equal to a third threshold, that the electrical signal unit ends; a module configured to determine, when a detected level duration is greater than the third threshold, that the signal is received completely; a module configured to convert each received electrical signal unit into a data unit; and a module configured to combine a plurality of data units into data.

In an embodiment of the present disclosure, the module configured to convert each received electrical signal unit into a data unit determines, according to a preset correspondence table, a data unit corresponding to the recorded number of level transitions in the electrical signal unit.

In an embodiment of the present disclosure, the first threshold is adjusted according to a pre-obtained flashing delay of a light emitting diode used as an emitter.

In an embodiment of the present disclosure, the second threshold and/or the third threshold is adjusted according to a pre-obtained flashing delay of a light emitting diode used as an emitter, the third threshold is greater than the second threshold, and the second threshold is greater than the first threshold.

In an embodiment of the present disclosure, the apparatus further includes a module configured to compare the data with a preset condition, and if the data matches the preset condition, use the data to control a controlled device, where that the data matches the preset condition includes that the data is the same as or corresponds to the preset condition.

The present disclosure further provides an optical key, including the foregoing apparatus for encoding a visible light signal.

The present disclosure further provides an optical controlled end, including the foregoing apparatus for decoding a visible light signal.

The present disclosure further provides an authentication system, including the foregoing optical key and the foregoing optical controlled end.

The present disclosure further provides an authentication system, including the foregoing apparatus for encoding a visible light signal and the foregoing apparatus for decoding a visible light signal.

In the method, apparatus, and system for encoding and decoding a visible light signal according to the present disclosure, identification data obtained by a mobile phone is divided into several electrical signal units, level durations are used to distinguish between the electrical signal units, and the number of level transitions is used to indicate identification data. In this encoding mode, a receive end can still correctly decode data even if there is a synchronization problem caused by a flashing delay of an LED. In addition, a level duration is adjusted according to a flashing delay, so that the level duration is effectively shortened, thereby increasing an amount of information transmitted within a unit time.

BRIEF DESCRIPTION OF THE DRAWINGS

The accompanying drawings constituting a part of the present application are used to provide a further understanding about the present disclosure. Exemplary embodiments of the present disclosure and descriptions thereof are used to explain the present disclosure, but do not constitute any inappropriate limitation on the present disclosure. In the drawings.

DESCRIPTION OF EMBODIMENTS

Figure 1:
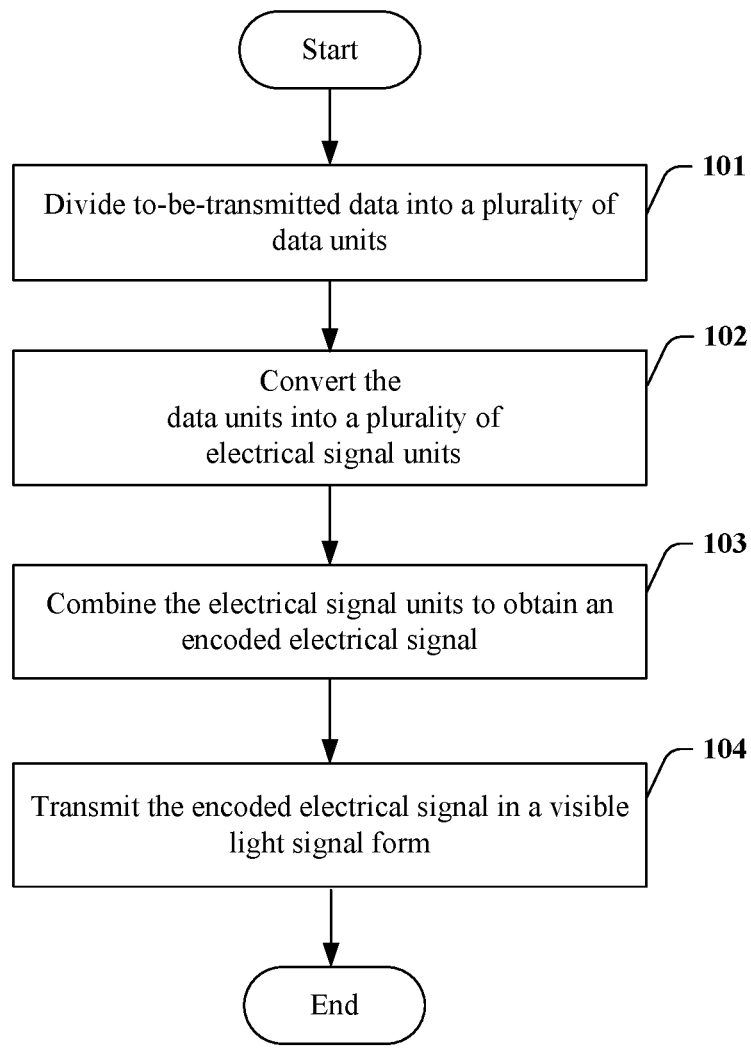
FIG. 1 shows a flowchart of a method for encoding a visible light signal according to Embodiment 1 of the present disclosure.

It should be noted that the embodiments in the present application and features in the embodiments may be combined with each other in a case of no conflict. The following describes the disclosure in detail with reference to the accompanying drawings and embodiments.

The embodiments of the disclosure provide an encoding and decoding method for improving an information transmission rate in visible light communication based on an LED.

After further research, it is found that a cause of a low transmission rate in visible light communication based on an LED is that there is a delay in controlling the LED to flashing. That is, durations of on and off states are always longer than an expected set value. A direct result caused by this phenomenon is that transmitting data with a same length from the LED takes a longer time than expected. Moreover, the delay in controlling flashing makes it difficult to perform synchronization between a transmit end and a receive end. According to a conventional technology, communication is performed by flashing an LED at a high frequency, where presence of light represents binary 1, and absence of light represents binary 0. However, due to lack of accurate synchronization, if presence of light and absence of light are respectively used to represent binary 1 and 0, a bit reception error may occur. For example, when a duration representing a binary bit 0 in a state of absence of light exceeds an set value, an excess of the duration is identified as another binary bit 0.

Because the LED has the foregoing disadvantage, it is necessary to provide a new encoding and decoding method. According to the embodiments of the disclosure, as a light signal, a state change between presence of light and absence of light, rather than the state of presence or absence of light itself, is used to represent information. As an electrical signal, a level transition rather than a level duration state itself is used to represent information.

Therefore, when encoding, to-be-transmitted data may be divided into a plurality of data units, where each data unit includes one or more bits. Then these data units are converted into a plurality of electrical signal units, where the number of level transitions represents the corresponding bits of each data unit. An interval between adjacent electrical signal units is indicated by a predetermined level. The level transitions may only include low-level to high-level transitions, only include high-level to low-level transitions, or include low-level to high-level transitions and high-level to low-level to transitions.

A duration (herein referred to as a first level duration) of a level in each electrical signal unit and a duration (herein referred to as a second level duration) of a level between adjacent electrical signal units are preset. The second level duration is so greater than the first level duration that the data can be correctly identified by a receive end.

In the embodiments of the disclosure, considering a flashing delay of an LED, when the first level duration is set, adjustment may be made according to the flashing delay of the light emitting diode used as an emitter. Generally, an expected level duration subtracts the flashing delay. For example, if the expected level duration is 3 ms, and the flashing delay is 2 ms, the level duration of the first level duration is 1 ms. The flashing delay of the light emitting diode may be predetermined through an experiment.

It is understood that the flashing delay has little impact on the second level duration. Optionally, when the second level duration is set, adjustment may also be made according to the flashing delay of the light emitting diode used as an emitter.

After an expected electrical signal is obtained, the electrical signal is used to control the light emitting diode to transmit in a visible light signal form.

A decoding process of the receive end is reverse. The receive end receives the visible light signal and converts it into an electrical signal. When detecting a level transition, a beginning of an electrical signal unit is determined. When a detected level duration is greater than a first threshold but less than or equal to a second threshold, the number of level transitions is recorded. When a detected level duration is greater than the second threshold but less than or equal to a third threshold, the finish of the electrical signal unit is determined. When a detected level duration is greater than the third threshold, the signal is received completely. The third threshold is greater than the second threshold, and the second threshold is greater than the first threshold. It is understood that the first threshold, the second threshold, and the third threshold are set with reference to the foregoing first level duration and second level duration.

After the reception is completed, the received electrical signal units are converted into data units, and then the data units are combined into data. Thereby, information represented by the visible light signal is obtained.

It is understood that a binary digit corresponds to at least one level transition. Therefore, the electrical signal unit is indicated by level transitions rather than level durations, even if all bit values in the electrical signal unit are 0.

The disclosure to be protected is hereinafter described with reference to the accompanying drawings, and in all the accompanying drawings, same reference numbers are used to indicate same components or steps. In the following description, for the purpose of explanation, multitudinous specific details are disclosed to provide a comprehensive understanding about the subject matter to be protected. However, apparently, the disclosure may also be implemented without using these specific details.

Embodiment 1

An encoding method and a corresponding decoding method in this embodiment are implemented on a mobile phone or a similar portable mobile terminal. The following uses only a mobile phone as an example for description.

Referring to FIG. 1, a flowchart of a method for encoding a visible light signal according to Embodiment 1 of the disclosure is provided. The encoding method includes:

Step 101: Divide to-be-transmitted data into a plurality of data units. Each data unit includes one or more bits. The to-be-transmitted data may be a text, a picture, an audio, and/or a video.

Step 102: Convert the data units into electrical signal units. For each electrical signal unit, the number of level transitions represents the one or more bits of a corresponding data unit. An interval between adjacent electrical signal units is indicated by a predetermined level. In this embodiment, a rising edge or a falling edge of a level may present a start of a transition.

For example, a duration of a high (or low) level in an electrical signal unit is 2 ms. Each electrical signal unit has four level transitions, including low-level to high-level transitions and high-level to low-level transitions. Each electrical signal unit indicates 2 bits of information. Four electrical signal units constitute one byte. When the number of low-level to high-level transitions and high-level to low-level transitions in an electrical signal unit is 1, it represents digits 00 of the information. When the number of low-level to high-level transitions and high-level to low-level transitions is 2, it represents digits 01 of information. When the number of low-level to high-level transitions and high-level to low-level transitions is 3, it represents digits 10 of information. When the number of low-level to high-level transitions and high-level to low-level transitions is 4, it represents digits 11 of information. A correspondence between the number of low-level to high-level transitions and high-level to low-level transitions and binaries of information represented by the number is shown in Table 1.

TABLE 1

| Number of level transitions | 1 | 2 | 3 | 4 |
|---|---|---|---|---|
| Information (2 bits) | 00 | 01 | 10 | 11 |

Therefore, a combination of levels of an electrical signal unit corresponding to a data unit may be determined according to the foregoing preset correspondence table.

Certainly, each electrical signal unit may indicate 1 bit of information. This requires a maximum of two transitions. By analogy, each electrical signal unit may indicate 3 bits of information. This requires a maximum of eight transitions.

It can be seen from the foregoing table that one level transition occurs even if bit values are 00. As an example rather than a limitation, this step is implemented in a data processor that is configured for optical communication in the mobile phone.

Herein, a first level duration may be adjusted according to an obtained flashing delay of a light emitting diode used as an emitter. An adjustment manner is to subtract the flashing delay from an expected first level duration to obtain a set first level duration. For example, a duration of a high (or low) level in an electrical signal unit is expected to be 2 ms. After adjustment according to the flashing delay, the set first level duration is less than 2 ms, or is even 0.

In addition, a second level duration of a high (or low) level between adjacent electrical signal units is greater than the first level duration, and may be set to 25 ms. This duration may be adjusted according to the flashing delay, or may not be adjusted.

Figure 3:
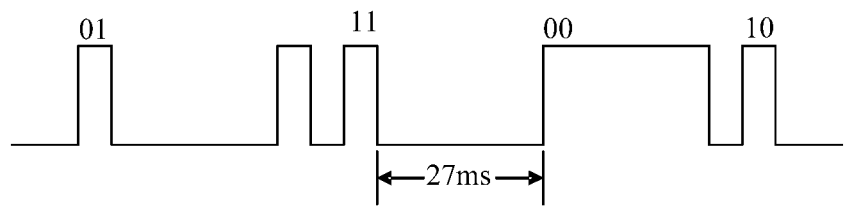
FIG. 3 shows an exemplary encoded electrical signal in visible light communication according to Embodiment 1 of the present disclosure.

Step 103: Combine the electrical signal units to obtain an encoded electrical signal. FIG. 3 shows an exemplary encoded signal. In the figure, a schematic view of a relationship between bit values and levels is shown. In the figure, four electrical signal units respectively have 2, 4, 1, and 3 level transitions, which respectively represent 01, 11, 00, and 10. The level transitions are comprised of low-level to high-level transitions and high-level to low-level transitions. A duration of a high (or low) level between adjacent electrical signal units is 27 ms. The combined signal includes one byte, and is indicated as 01110010 in binary notation or 0x72 in hexadecimal notation.

Step 104: Transmit the encoded electrical signal in a visible light signal form.

Herein, control the light emitting diode to transmit the encoded electrical signal in the visible light signal form.

Figure 2:
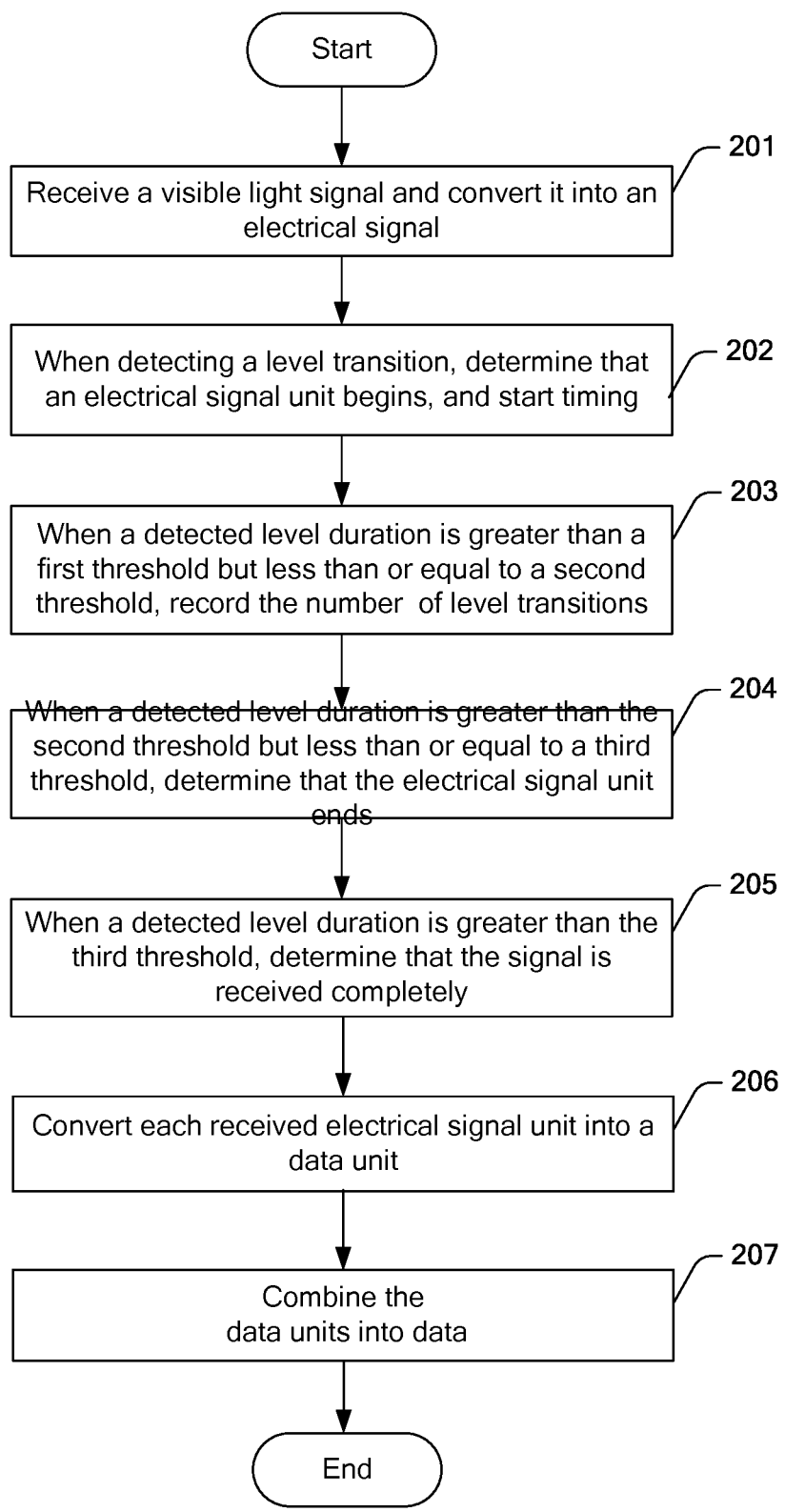
FIG. 2 shows a flowchart of a method for decoding a visible light signal according to Embodiment 1 of the present disclosure.

Referring to FIG. 2, a flowchart of a method for decoding a visible light signal according to Embodiment 1 of the disclosure is shown. The decoding method includes:

Step 201: A mobile phone receives a visible light signal and converts it into an electrical signal. During reception, an optical receiver of the receiving mobile phone needs to face toward an LED emitter of a transmit end.

Step 202: When detecting a level transition, determine that an electrical signal unit begins, and start timing. The level transition may be a low-level to high-level transition, or conversely, may be a high-level to low-level transition.

Step 203: When a detected level duration is greater than a first threshold but less than or equal to a second threshold, which indicates that the electrical signal unit is still ongoing, record the number of level transitions in this period. The ongoing level may be a high level or a low level. In this embodiment, a rising edge or a falling edge of a level may be recorded as a start of a transition.

Step 204: When a detected level duration is greater than the second threshold but less than or equal to a third threshold, determine that the electrical signal unit ends.

Step 205: When a detected level duration is greater than the third threshold, determine that the signal is received completely.

The third threshold is greater than the second threshold, and the second threshold is greater than the first threshold. In addition, corresponding to the adjustment of the first level duration at the transmit end, the first threshold may be adjusted according to the same flashing delay, so that representative levels can be determined correctly. In addition, the second threshold and the third threshold may be adjusted according to the flashing delay, or may not be adjusted according to the flashing delay.

For example, the first, second, and third thresholds are respectively set to 0 ms, 25 ms, and 60 ms. When a rising edge (or a falling edge) is detected, timing is started. When a detected high (or low) level duration is greater than 0 but less than or equal to 25 ms, the number of low-level to high-level transitions and high-level to low-level transitions is recorded. When a detected high (or low) level duration is greater than 25 ms but less than or equal to 60 ms, it is considered that the electrical signal unit ends. When a detected high (or low) level duration is greater than 60 ms, it is considered that the signal is received completely.

In another case, that the high (or low) level duration is greater than the third threshold may represent interruption of signal reception and restart of signal detection.

Step 206: Convert each received electrical signal unit into a data unit.

Step 207: Combine the data units into data, and thereby obtaining information represented by the visible light signal.

In the encoding mode provided by this embodiment, data is divided into electrical signal units. Adjacent electrical signal units are separated by a level with a predetermined duration. In an electrical signal unit, the number of level transitions is used to indicate information. In this encoding mode, a receive end can still correctly decode data even if there is a synchronization problem caused by a flashing delay of an LED. In addition, a level duration is adjusted according to the flashing delay, so that the level duration is effectively shortened, thereby increasing an amount of information transmitted within a unit time.

In this embodiment, a mobile phone is used as a signal transmit end. An LED of the mobile phone is used to transmit signals in a visible light signal form. A receive end determines, by timing, that signal reception ends, or that reception is interrupted, or that reception is complete, and records the number of low-level to high-level transitions and high-level to low-level transitions that represents information in an electrical signal unit. Therefore, in this embodiment, communication between the mobile phone and the receive end for receiving visible light signal may be implemented, and thereby user experience is enhanced.

Embodiment 2

In this embodiment, an optical access control system is provided. A mobile phone may be used as a transmit end, and an access control end is used as a receive end. In an alternative embodiment, an optical key is used instead of the mobile phone. The access control end decodes a signal, and may further perform matching by using the signal, and thereby determining whether to open a door.

Figure 4:
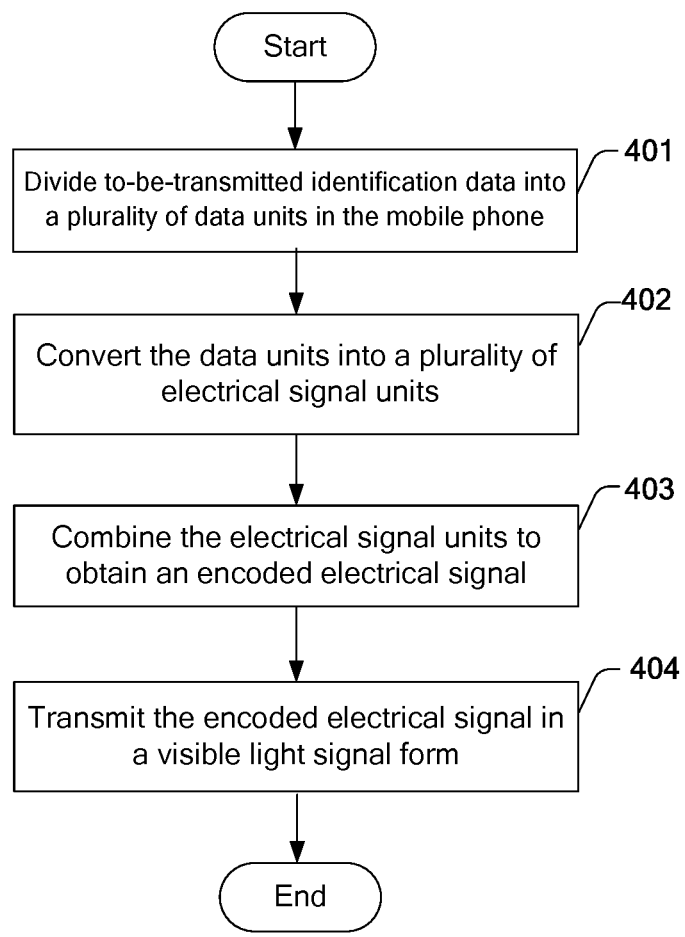
FIG. 4 shows a flowchart of a method for encoding a visible light signal according to Embodiment 2 of the present disclosure.

FIG. 4 shows a flowchart of a method for encoding a visible light signal according to Embodiment 2 of the disclosure. Referring to FIG. 4, the encoding method is as follows:

Step 401: Divide to-be-transmitted identification data into a plurality of data units in the mobile phone, where each data unit includes one or more bits.

Step 402: Convert the data units into electrical signal units. For each electrical signal unit, the number of level transitions is used to represent the one or more bits of a corresponding data unit. An interval indicated by a predetermined level exists between adjacent electrical signal units. In this embodiment, a rising edge or a falling edge of a level may represent a start of a transition.

For example, a duration of a high (or low) level in an electrical signal unit is 2 ms. Each electrical signal unit has four level transitions, including low-level to high-level transitions and high-level to low-level transitions. Each electrical signal unit indicates 2 bits of information. Four electrical signal units constitute one byte. When the number of low-level to high-level transitions and high-level to low-level transitions in an electrical signal unit is 1, information 00 is represented. When the number of low-level to high-level transitions and high-level to low-level transitions is 2, information 01 is represented. When the number of low-level to high-level transitions and high-level to low-level transitions is 3, information 10 is represented. When the number of low-level to high-level transitions and high-level to low-level transitions is 4, information 11 is represented. A correspondence between the number of low-level to high-level transitions and high-level to low-level transitions and information represented by the number is shown in Table 1.

Certainly, each electrical signal unit may indicate 1 bit of information. This requires a maximum of two transitions. By analogy, each electrical signal unit may indicate 3 bits of information. This requires a maximum of eight transitions.

As an example rather than a limitation, this step is implemented by a data processor that is configured for optical communication in the mobile phone.

Herein, a first level duration may be adjusted according to a pre-obtained flashing delay of a light emitting diode used as an emitter. An adjustment manner is to subtract the flashing delay from an expected first level duration to obtain a set first level duration. For example, a first level duration of a high (or low) level in an electrical signal unit is expected to be 2 ms. After adjustment according to the flashing delay, the set first level duration is less than 2 ms, or is even 0.

In addition, a second level duration of a high (or low) level between two adjacent electrical signal units may be set to 25 ms. This duration may be adjusted according to the flashing delay, or may not be adjusted.

Step 403: Combine the electrical signal units to obtain an encoded electrical signal. FIG. 3 shows an exemplary encoded signal. A schematic view of a relationship between the bit value and the level is shown. In the figure, four electrical signal units respectively have 2, 4, 1, and 3 level transitions, which respectively represent 01, 11, 00, and 10. The level transitions include low-level to high-level transitions and high-level to low-level transitions. a duration of a high (or low) level between two adjacent electrical signal units is 27 ms. The signal after combination has one byte length. The signal is indicated as 01110010 in binary notation, and as 0x72 in hexadecimal notation.

Step 404: Transmit the encoded electrical signal in a visible light signal form. During transmission, an LED emitter of the mobile phone needs to be aimed at an optical receiver of a controlled end in an optical access control system.

Figure 5:
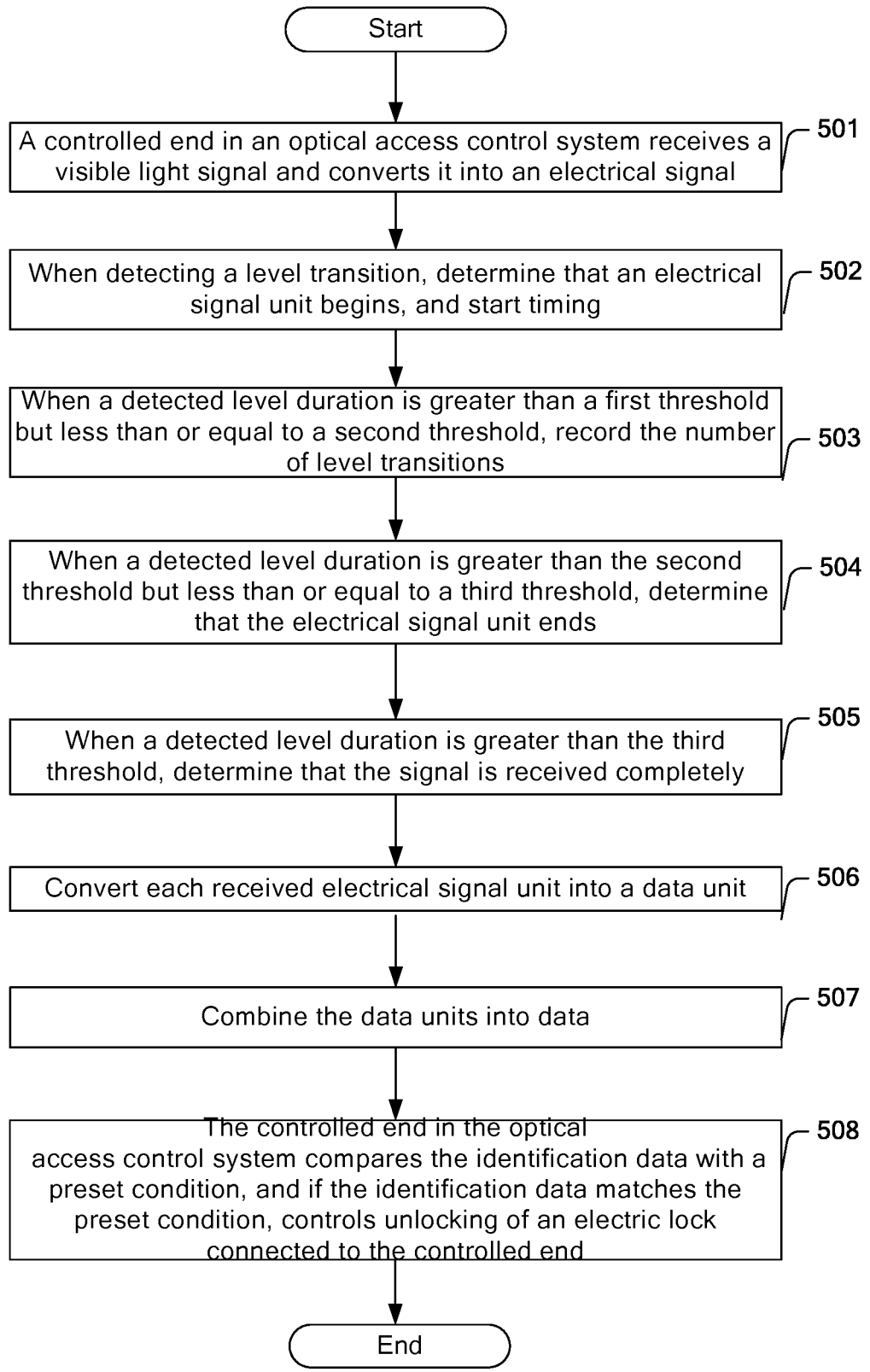
FIG. 5 shows a flowchart of a method for decoding a visible light signal according to Embodiment 2 of the present disclosure.

Referring to FIG. 5, a flowchart of a method for decoding a visible light signal according to Embodiment 2 of the disclosure is provided. The decoding method includes:

Step 501: A controlled end in an optical access control system receives a visible light signal and converts it into an electrical signal.

Step 502: When detecting a level transition, determine that an electrical signal unit begins, and start timing. The level transition may be a low-level to high-level transition, or conversely, may be a high-level to low-level transition.

Step 503: When a detected level duration is greater than a first threshold but less than or equal to a second threshold, which indicates that the electrical signal unit is processing, record the number of level transitions in this period. The processing level may be a high level or a low level. In this embodiment, a rising edge or a falling edge of a level may be recorded as a start of a transition.

Step 504: When a detected level duration is greater than the second threshold but less than or equal to a third threshold, determine that the electrical signal unit ends.

Step 505: When a detected level duration is greater than the third threshold, determine that the signal is received completely.

The third threshold is greater than the second threshold, and the second threshold is greater than the first threshold.

For example, the first, second, and third thresholds are respectively set to 0 ms, 25 ms, and 60 ms. When the rising edge (or the falling edge) is detected, timing is started. When the detected high (or low) level duration is greater than 0 but less than or equal to 25 ms, the number of low-level to high-level transitions and high-level to low-level transitions is recorded. When the detected high (or low) level duration is greater than 25 ms but less than or equal to 60 ms, it is considered that the electrical signal unit ends. When the detected high (or low) level duration is greater than 60 ms, it is considered that the signal is received completely.

In another case, that the high (or low) level duration is greater than the third threshold may represent interruption of signal reception. In this situation, signal detection is restarted.

Step 506: Convert each received electrical signal unit into a data unit.

Step 507: The controlled end in the optical access control system combines the data units into identification data, thereby obtaining information represented by the visible light signal.

Step 508: The controlled end in the optical access control system compares the identification data with a preset condition. If the identification data matches the preset condition, an electric lock connected to the controlled end is controlled to be opened.

In this embodiment, the identification data matching the preset condition includes the identification data being the same as the preset condition, or the identification data has predetermined corresponding relationship to the preset condition.

In the encoding mode provided by this embodiment, identification data obtained by a mobile phone is divided into several electrical signal units. Level durations are used to divide the electrical signal units, and the number of level transitions is used to represent identification data. In this encoding mode, a receive end can still correctly decode data even if there is a synchronization problem caused by a flashing delay of an LED. In addition, a level duration is adjusted according to a flashing delay, so that the level duration is effectively shortened, thereby increasing an amount of information transmitted within a unit time.

In this embodiment, a mobile phone is used as a transmit end in an optical access control system. Encoded identification data is transmitted in a visible light signal form by using an LED of the mobile phone. A controlled end in the optical access control system decodes the visible light signal received from the mobile phone, then performs authentication according to the identification data obtained by decoding. If the authentication is passed, an electric lock connected to the controlled end is controlled to be opened. Therefore, unlocking by using a mobile phone is implemented, and user experience is improved.

Embodiment 3

This embodiment is implemented in an optical lock system. A dedicated optical key may be used as a transmit end. A controlled end in the optical lock system is used as a receive end. In an alternative embodiment, a mobile phone may be used instead of the optical key. The controlled end in the optical lock system decodes a signal, and may further perform matching by using the signal, thereby determining whether to perform unlocking.

Figure 6:
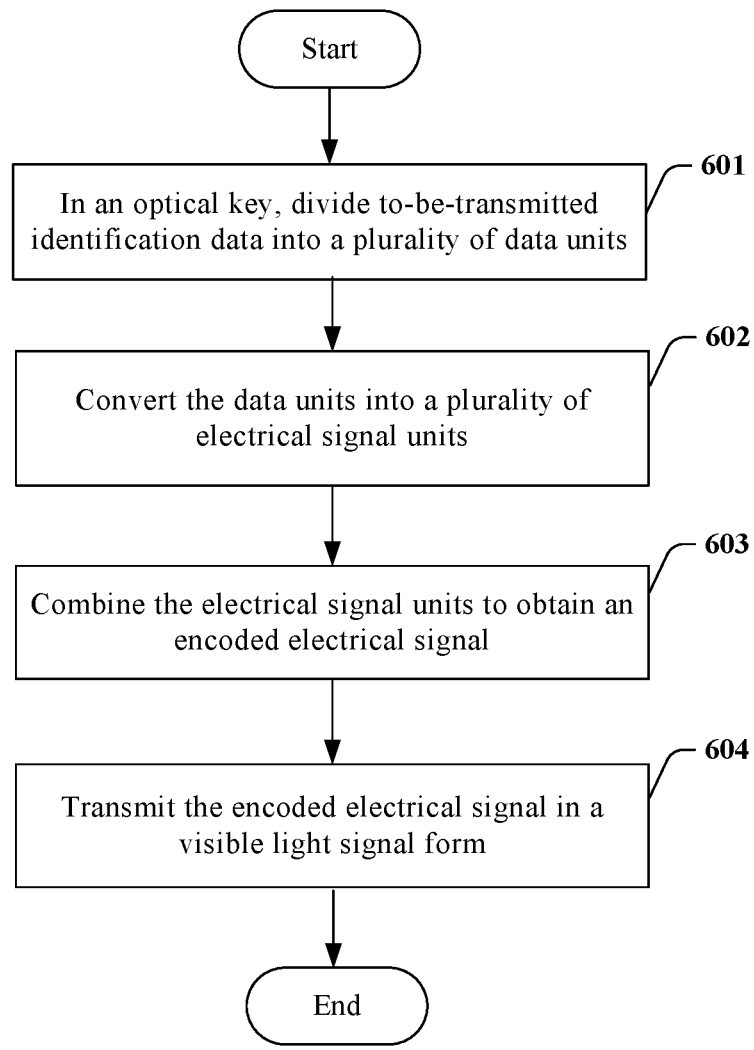
FIG. 6 shows a flowchart of a method for encoding a visible light signal according to Embodiment 3 of the present disclosure.

FIG. 6 shows a flowchart of a method for encoding a visible light signal according to Embodiment 3 of the disclosure. Referring to FIG. 6, the encoding method is as follows:

Step 601: Divide to-be-transmitted identification data into a plurality of data units. Each data unit includes one or more bits.

Step 603: Convert the data units into electrical signal units. For each electrical signal unit, the number of level transitions is used to represent the one or more bits of a corresponding data unit. An interval indicated by a predetermined level exists between adjacent electrical signal units. In this embodiment, a rising edge or a falling edge of a level may be used as a start of a transition.

For example, a duration of a high (or low) level in an electrical signal unit is 2 ms. Each electrical signal unit has four level transitions, including low-level to high-level transitions. Each electrical signal unit indicates 2 bits of information. Four electrical signal units constitute one byte. When the number of low-level to high-level transitions in an electrical signal unit is 1, information 00 is represented. When the number of low-level to high-level transitions is 2, information 01 is represented. When the number of low-level to high-level transitions is 3, information 10 is represented. When the number of low-level to high-level transitions is 4, information 11 is represented. A correspondence between the number of low-level to high-level transitions and information represented by the number is shown in Table 1.

Certainly, each electrical signal unit may indicate N bits of information, and N is a natural number, for example, 1 bit of information. This requires a maximum of two transitions. By analogy, each electrical signal unit may indicate 3 bits information. This requires a maximum of 8 transitions. For example, when the number of low-level to high-level transitions and/or high-level to low-level transitions in an electrical signal unit is 1, information 000 is represented. When the number of low-level to high-level transitions and/or high-level to low-level transitions is 2, information 001 is represented. When the number of low-level to high-level transitions and/or high-level to low-level transitions is 3, information 010 is represented. When the number of low-level to high-level transitions and/or high-level to low-level transitions is 4, information 011 is represented. When the number of low-level to high-level transitions and/or high-level to low-level transitions in an electrical signal unit is 5, information 100 is represented. When the number of low-level to high-level transitions and/or high-level to low-level transitions is 6, information 101 is represented. When the number of low-level to high-level transitions and/or high-level to low-level transitions is 7, information 110 is represented. When The number of low-level to high-level transitions and/or high-level to low-level transitions is 8, information 111 is represented. The information represented by the foregoing numbers of transitions may be set according to a user's requirement and custom.

As an example rather than a limitation, this step is implemented in a data processor that is configured for optical communication in the optical key.

Herein, the first level duration may be adjusted according to a pre-obtained flashing delay of a light emitting diode used as an emitter. An adjustment manner is to subtract the flashing delay from an expected first level duration to obtain a set first level duration. For example, a first level duration of a high (or low) level in an electrical signal unit is expected to be 2 ms. After adjustment according to the flashing delay, the set first level duration is less than 2 ms, or is even 0.

In addition, a second level duration of a high (or low) level between two adjacent electrical signal units may be set to 25 ms. This duration may be adjusted according to the flashing delay, or may not be adjusted.

Figure 8:
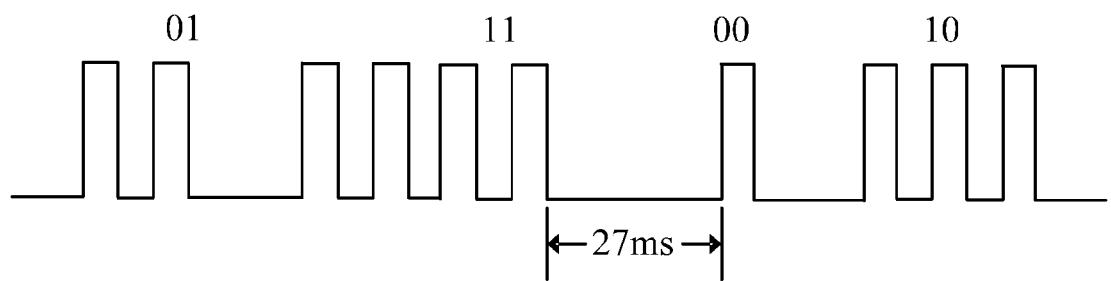
FIG. 8 shows an exemplary encoded electrical signal in visible light communication according to Embodiment 3 of the present disclosure.

Step 603: Combine the electrical signal units to obtain an encoded electrical signal. FIG. 8 shows an exemplary encoded signal. A schematic view of a relationship between the bit value and the level is shown. In the figure, four electrical signal units respectively have 2, 4, 1, and 3 low-level to high-level transitions, which respectively represent 01, 11, 00, and 10. A duration of a high or low level between two adjacent electrical signal units is 27 ms. The signal after combination has one byte length. the signal is indicated as 01110010 in binary notation, and as 0x72 in hexadecimal notation.

Step 604: Transmit the encoded electrical signal in a visible light signal form. Herein, the light emitting diode is controlled to transmit the encoded electrical signal in the visible light signal form. During transmission, an LED emitter of the optical key needs to be aimed at an optical receiver of a controlled end in an optical lock system.

Figure 7:
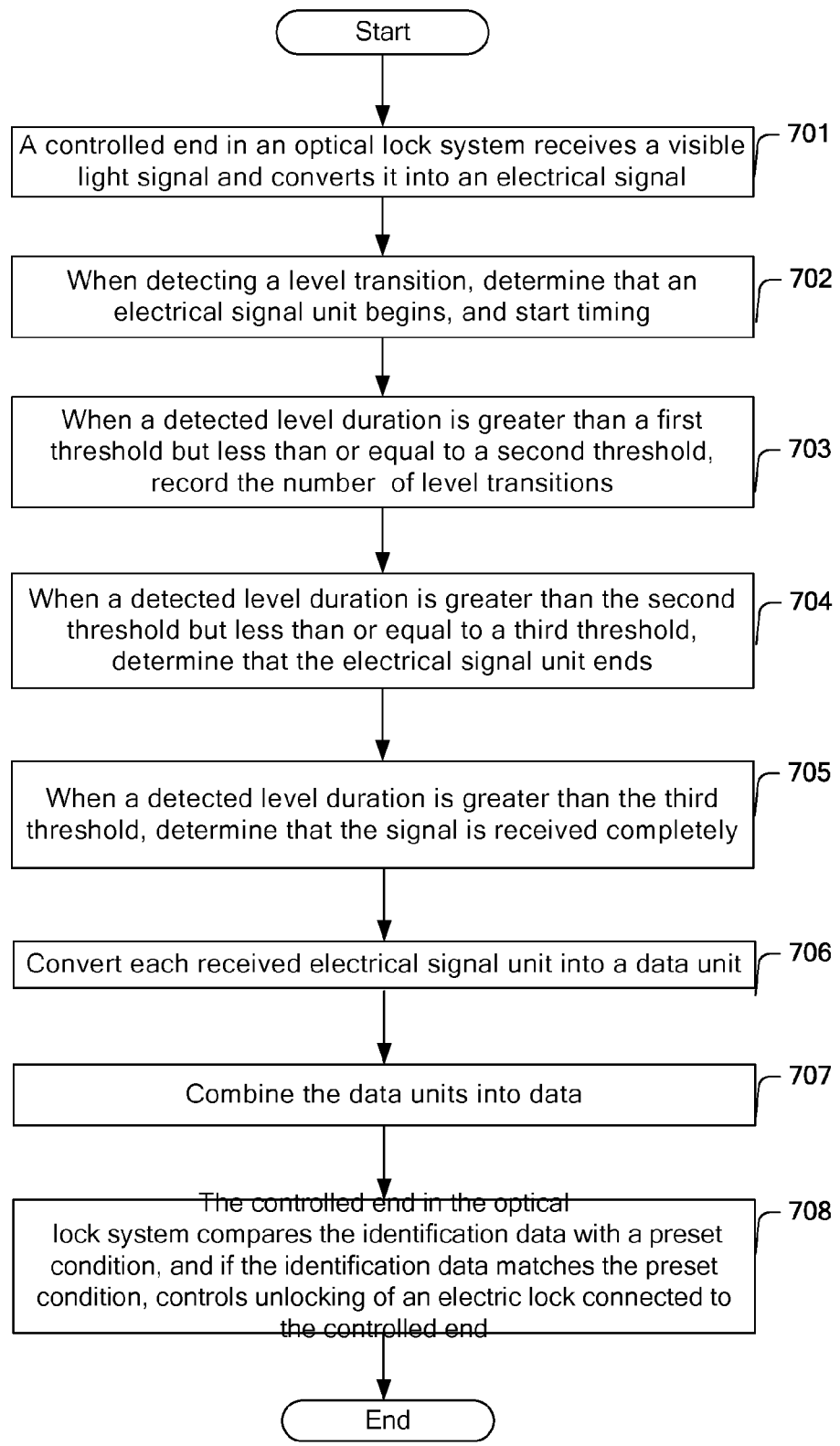
FIG. 7 shows a flowchart of a method for decoding a visible light signal according to Embodiment 3 of the present disclosure.

Referring to FIG. 7, a flowchart of a method for decoding a visible light signal according to Embodiment 3 of the disclosure is provided. The decoding method includes:

Step 701: A controlled end in an optical lock system receives a visible light signal and converts it into an electrical signal.

Step 702: When detecting a level transition, determine that an electrical signal unit begins, and start timing. The level transition may be a low-level to high-level transition, or conversely, may be a high-level to low-level transition.

Step 703: When a detected level duration is greater than a first threshold but less than or equal to a second threshold, which indicates that the electrical signal unit is processing, record the number of level transitions in this period. The processing level may be a high level or a low level. In this embodiment, a rising edge or a falling edge of a level may be recorded as a start of a transition.

Step 704: When a detected level duration is greater than the second threshold but less than or equal to a third threshold, determine that the electrical signal unit ends.

Step 705: When a detected level duration is greater than the third threshold, determine that the signal is received completely.

The third threshold is greater than the second threshold, and the second threshold is greater than the first threshold.

For example, the first, second, and third thresholds are respectively set to 0 ms, 25 ms, and 60 ms. When the rising edge is detected, timing is started. When the detected low level duration is greater than 0 but less than or equal to 25 ms, the number of low-level to high-level transitions is recorded. When the detected low level duration is greater than 25 ms but less than or equal to 60 ms, it is considered that the electrical signal unit ends. When the detected low level duration is greater than 60 ms, it is considered that the signal is received completely.

In another case, that the low level duration is greater than the third threshold may represent interruption of signal reception. In this situation, signal detection is restarted.

Step 706: Convert each received electrical signal unit into a data unit.

Step 707: The controlled end in the optical lock system combines the data units into identification data, thereby obtaining information represented by the visible light signal.

Step 708: The controlled end in the optical lock system compares the identification data with a preset condition. If the identification data matches the preset condition, an electric lock connected to the controlled end is controlled to be opened.

In this embodiment, the identification data matching the preset condition includes the identification data being the same as the preset condition, or the identification data has predetermined corresponding relationship to the preset condition.

In the encoding mode provided by this embodiment, identification data obtained by an optical key is divided into several electrical signal units. Adjacent electrical signal units are separated by a level with a predetermined duration. The number of level transitions is used to indicate identification data. In this encoding mode, a receive end can still correctly decode data even if there is a synchronization problem caused by a flashing delay of an LED. In addition, a level duration is adjusted according to a flashing delay, so that the level duration is effectively shortened, thereby increasing an amount of information transmitted within a unit time.

The disclosure further provides an apparatus for encoding a visible light signal. The apparatus includes: a module configured to divide to-be-transmitted data into a plurality of data units, where each data unit includes one or more bits; a module configured to convert the data units into electrical signal units, where for each electrical signal unit, the number of level transitions is used to represent the one or more bits of the corresponding data unit, and an interval indicated by a predetermined level exists between adjacent electrical signal units, the level in each electrical signal unit has a first level duration, and the predetermined level between adjacent electrical signal units has a second level duration; a module configured to combine the electrical signal units to obtain an encoded electrical signal; and a module configured to transmit the encoded electrical signal in a visible light signal form.

The level transitions are low-level to high-level transitions or/and high-level to low-level transitions.

The module configured to convert the data units into electrical signal units determines, according to a preset correspondence table, the number of level transitions in an electrical signal unit corresponding to the to-be-transmitted data unit.

The first level duration is adjusted according to a pre-obtained flashing delay of a light emitting diode used as an emitter.

The second level duration is significantly greater than the first level duration.

The second level duration is adjusted according to a pre-obtained flashing delay of a light emitting diode used as an emitter.

Each data unit includes N bits, and N is a natural number.

The disclosure further provides an apparatus for decoding a visible light signal. The apparatus includes: a module configured to receive a visible light signal and convert it into an electrical signal; a module configured to determine, when a level transition is detected, that an electrical signal unit begins, and start timing; a module configured to record the number of level transitions when a detected level duration is greater than a first threshold but less than or equal to a second threshold; a module configured to determine, when a detected level duration is greater than the second threshold but less than or equal to a third threshold, that the electrical signal unit ends; a module configured to determine, when a detected level duration is greater than the third threshold, that the signal is received completely; a module configured to convert each received electrical signal unit into a data unit; and a module configured to combine data units into data.

The level transitions are low-level to high-level transitions and/or high-level to low-level transitions.

The module configured to convert each received electrical signal unit into a data unit determines, according to a preset correspondence table, a data unit corresponding to the recorded number of level transitions in the electrical signal unit.

The first threshold is adjusted according to a pre-obtained flashing delay of a light emitting diode used as an emitter.

The second threshold and/or the third threshold are/is adjusted according to a pre-obtained flashing delay of a light emitting diode used as an emitter. The third threshold is greater than the second threshold, and the second threshold is greater than the first threshold.

The apparatus further includes a module configured to compare the data with a preset condition, and if the data matches the preset condition, use the data to control a controlled device. The data matching the preset condition includes the data being the same as or corresponding to the preset condition.

The disclosure further provides an authentication system. The authentication system may be an access control system, a metro system, a payment system, or a consumption management system. The authentication system includes an optical key and an optical controlled end. The optical key includes the foregoing apparatus for encoding a visible light signal. The optical controlled end includes the foregoing apparatus for decoding a visible light signal. Using the access control system as an example, in this embodiment, the optical key is used as a transmit end, and encoded identification data is transmitted in a visible light signal form by using an LED of the optical key. The optical controlled end decodes the visible light signal received from the optical key, then performs authentication according to the identification data obtained by decoding. If the authentication is passed, the optical controlled end controls a controllable lock connected to the optical controlled end to be opened. Therefore, unlocking is implemented, and user experience is improved. The lock may also be replaced with any other access control switch apparatus capable of switching between an on state and an off state, for example, a gate.

The disclosure further provides an authentication system, including the foregoing apparatus for encoding a visible light signal and the foregoing apparatus for decoding a visible light signal.

The foregoing descriptions are merely exemplary embodiments of the disclosure, but are not intended to limit the disclosure. Persons skilled in the art understand that the disclosure may have various modifications and variations. Any modification, equivalent replacement, and improvement made without departing from the spirit and principle of the disclosure shall fall within the protection scope of the disclosure.

What is claimed is:

1. A method for encoding a visible light signal, comprising:
   dividing to-be-transmitted data into a plurality of data units, each data unit comprising one or more bits;
   converting the data units into electrical signal units, for each electrical signal unit, the number of level transitions used to represent the one or more bits of a corresponding data unit, and an interval indicated by a predetermined level existing between adjacent electrical signal units, the level transitions comprising low-level to high-level transitions and high-level to low-level transitions, a level in each electrical signal unit having a first level duration, and the predetermined level between adjacent electrical signal units having a second level duration;
   combining the electrical signal units to obtain an encoded electrical signal; and
   transmitting the encoded electrical signal in a visible light signal form.

2. The method according to claim 1, wherein the step of converting the data units into electrical signal units comprises: determining, according to a preset correspondence table, the number of level transitions in an electrical signal unit corresponding to the to-be-transmitted data unit.

3. The method according to claim 1, wherein the first level duration is adjusted according to a pre-obtained flashing delay of a light emitting diode used as an emitter.

4. The method according to claim 1, wherein the second level duration is significantly greater than the first level duration.

5. The method according to claim 1, wherein the second level duration is adjusted according to a pre-obtained flashing delay of a light emitting diode used as an emitter.

6. A method for decoding a visible light signal, comprising:
   receiving a visible light signal and converting it into an electrical signal;
   when detecting a level transition, determining that an electrical signal unit begins, and starting timing;
   when a detected level duration is greater than a first threshold but less than or equal to a second threshold, recording the number of level transitions, the level transitions comprising low-level to high-level transitions and high-level to low-level transitions;
   when a detected level duration is greater than the second threshold but less than or equal to a third threshold, determining that the electrical signal unit ends;
   when a detected level duration is greater than the third threshold, determining that the signal is received completely;
   converting each received electrical signal unit into a data unit; and
   combining data units into data.

7. The method according to claim 6, wherein the step of converting each received electrical signal unit into a data unit comprises: determining, according to a preset correspondence table, a data unit corresponding to the recorded number of level transitions in the electrical signal unit.

8. The method according to claim 6, wherein the first threshold is adjusted according to a pre-obtained flashing delay of a light emitting diode used as an emitter.

9. The method according to claim 6, wherein the second threshold and/or the third threshold are/is adjusted according to a pre-obtained flashing delay of a light emitting diode used as an emitter, the third threshold is greater than the second threshold, and the second threshold is greater than the first threshold.

10. The method according to claim 6 further comprising: comparing the data with a preset condition, and if the data matches the preset condition, using the data to control a controlled device, the data matching the preset condition comprising the data being the same as or corresponding to the preset condition.

11. An apparatus for encoding and decoding a visible light signal,
   the apparatus for encoding comprises a first hardware processor, a first memory and an emitter, wherein the first hardware processor is configured to execute multiple first programming modules stored in the memory, and the multiple first programming modules comprise:
   a module configured to divide to-be-transmitted data into a plurality of data units, each data unit comprising one or more bits;
   a module configured to convert the data units into electrical signal units, for each electrical signal unit, the number of level transitions is used to represent the one or more bits of a corresponding data unit, and an interval indicated by a predetermined level existing between adjacent electrical signal units, the level transitions comprising low-level to high-level transitions and high-level to low-level transitions, a level in each electrical signal unit having a first level duration, and the predetermined level between adjacent electrical signal units having a second level duration;
   a module configured to combine the electrical signal units to obtain an encoded electrical signal; and
   the emitter configured to transmit the encoded electrical signal in a visible light signal form;
   the apparatus for decoding comprises a second hardware processor and a second memory, and the second hardware processor is configured to execute multiple second programming modules stored in the memory, the multiple second programming modules comprise:
   a module configured to receive a visible light signal and convert it into an electrical signal;
   a module configured to determine, when a level transition is detected, that an electrical signal unit begins, and start timing;

a module configured to record the number of level transitions when a detected level duration is greater than a first threshold but less than or equal to a second threshold, the level transitions comprising low-level to high-level transitions and high-level to low-level transitions;

a module configured to determine, when a detected level duration is greater than the second threshold but less than or equal to a third threshold, that the electrical signal unit ends;

a module configured to determine, when a detected level duration is greater than the third threshold, that the signal is received completely;

a module configured to convert each received electrical signal unit into a data unit; and a module configured to combine data units into data.

12. The apparatus according to claim 11, wherein the first programming modules further comprise:

the module configured to convert the data units into electrical signal units determines, according to a preset correspondence table, the number of level transitions in an electrical signal unit corresponding to the to-be-transmitted data unit.

13. The apparatus according to claim 11, wherein the first level duration is adjusted according to a pre-obtained flashing delay of a light emitting diode used as an emitter.

14. The apparatus according to claim 11, wherein the second level duration is significantly greater than the first level duration.

15. The apparatus according to claim 11, wherein the second level duration is adjusted according to a pre-obtained flashing delay of a light emitting diode used as an emitter.

16. The apparatus according to claim 11, each data unit comprises N bits and N is a natural number.

17. The apparatus according to claim 11, wherein the second programming modules further comprise:

the module configured to convert each received electrical signal unit into a data unit determines, according to a preset correspondence table, a data unit corresponding to the recorded number of level transitions in the electrical signal unit.

18. The apparatus according to claim 11, wherein the first threshold is adjusted according to a pre-obtained flashing delay of a light emitting diode used as an emitter.

19. The apparatus according to claim 11, wherein the second threshold and/or the third threshold are/is adjusted according to a pre-obtained flashing delay of a light emitting diode used as an emitter, the third threshold is greater than the second threshold, and the second threshold is greater than the first threshold.

20. The apparatus according to claim 11, wherein the first programming modules further comprise:

a module configured to compare the data with a preset condition, and if the data matches the preset condition, use the data to control a controlled device, the data matching the preset condition comprising the data being the same as or corresponding to the preset condition.

* * * * *